US010441900B1

(12) United States Patent
Davis

(10) Patent No.: US 10,441,900 B1
(45) Date of Patent: Oct. 15, 2019

(54) WATER TREATMENT SYSTEM

(76) Inventor: Robert M. Davis, Brandon, FL (US)

(*) Notice: Subject to any disclaimer, the term of this patent is extended or adjusted under 35 U.S.C. 154(b) by 0 days.

(21) Appl. No.: 13/373,589

(22) Filed: Nov. 21, 2011

Related U.S. Application Data

(60) Provisional application No. 61/628,495, filed on Nov. 1, 2011.

(51) Int. Cl.
| | | |
|---|---|---|
| C02F 9/02 | (2006.01) | |
| C02F 1/56 | (2006.01) | |
| B01D 21/01 | (2006.01) | |
| B01D 21/24 | (2006.01) | |
| C02F 1/52 | (2006.01) | |
| B01F 3/08 | (2006.01) | |
| B01F 5/06 | (2006.01) | |
| C02F 9/00 | (2006.01) | |
| C02F 1/00 | (2006.01) | |
| B01F 5/04 | (2006.01) | |
| B01F 13/10 | (2006.01) | |

(52) U.S. Cl.
CPC ......... *B01D 21/01* (2013.01); *B01D 21/2405* (2013.01); *B01F 3/0865* (2013.01); *B01F 5/0602* (2013.01); *C02F 1/52* (2013.01); *C02F 1/56* (2013.01); *B01F 5/0473* (2013.01); *B01F 13/1016* (2013.01); *C02F 9/00* (2013.01); *C02F 2001/007* (2013.01)

(58) Field of Classification Search
CPC .... B01D 21/01; B01D 21/08; B01D 21/2405; C02F 1/52; C02F 1/56; C02F 9/00; C02F 9/005; C02F 2001/007; B01F 3/0865; B01F 5/0473; B01F 5/0602; B01F 13/1016

See application file for complete search history.

(56) References Cited

U.S. PATENT DOCUMENTS

| | | | | |
|---|---|---|---|---|
| 3,920,550 | A * | 11/1975 | Farrell et al. | 210/86 |
| 4,536,286 | A * | 8/1985 | Nugent | 210/202 |
| 4,576,714 | A * | 3/1986 | Pohoreski | 210/195.1 |
| 5,000,859 | A * | 3/1991 | Suciu et al. | 210/713 |
| 6,379,555 | B1 * | 4/2002 | Targosz | 210/663 |
| 2004/0129639 | A1 * | 7/2004 | Allen et al. | 210/650 |
| 2007/0095747 | A1 * | 5/2007 | Theisen et al. | 210/503 |
| 2013/0168326 | A1 * | 7/2013 | Bouchard et al. | 210/738 |

OTHER PUBLICATIONS

PURE Polymer Solutions Brochure "PUREMIX 6×6" (2 pages), not dated.*
PURE Polymer Solutions Brochure "PUREMIX 4×4" (2 pages), not dated.*
PURE Polymer Solutions Brochure "PUREMIX 10×10 Super Mix" (2 pages), not dated.*

* cited by examiner

*Primary Examiner* — Terry K Cecil
(74) *Attorney, Agent, or Firm* — Frijouf, Rust & Pyle, P.A.

(57) ABSTRACT

A mixing assembly has a container adapted to receive a continuous flow of turbid or contaminated water. An injector is adapted to inject a quantity of polymer into the container. A settling assembly is adapted to receive a continuous flow of polymer water from the mixing assembly via a pump. A first line couples the mixing assembly with a source of turbid or contaminated water. A second line couples the mixing assembly and the settling assembly.

19 Claims, 6 Drawing Sheets

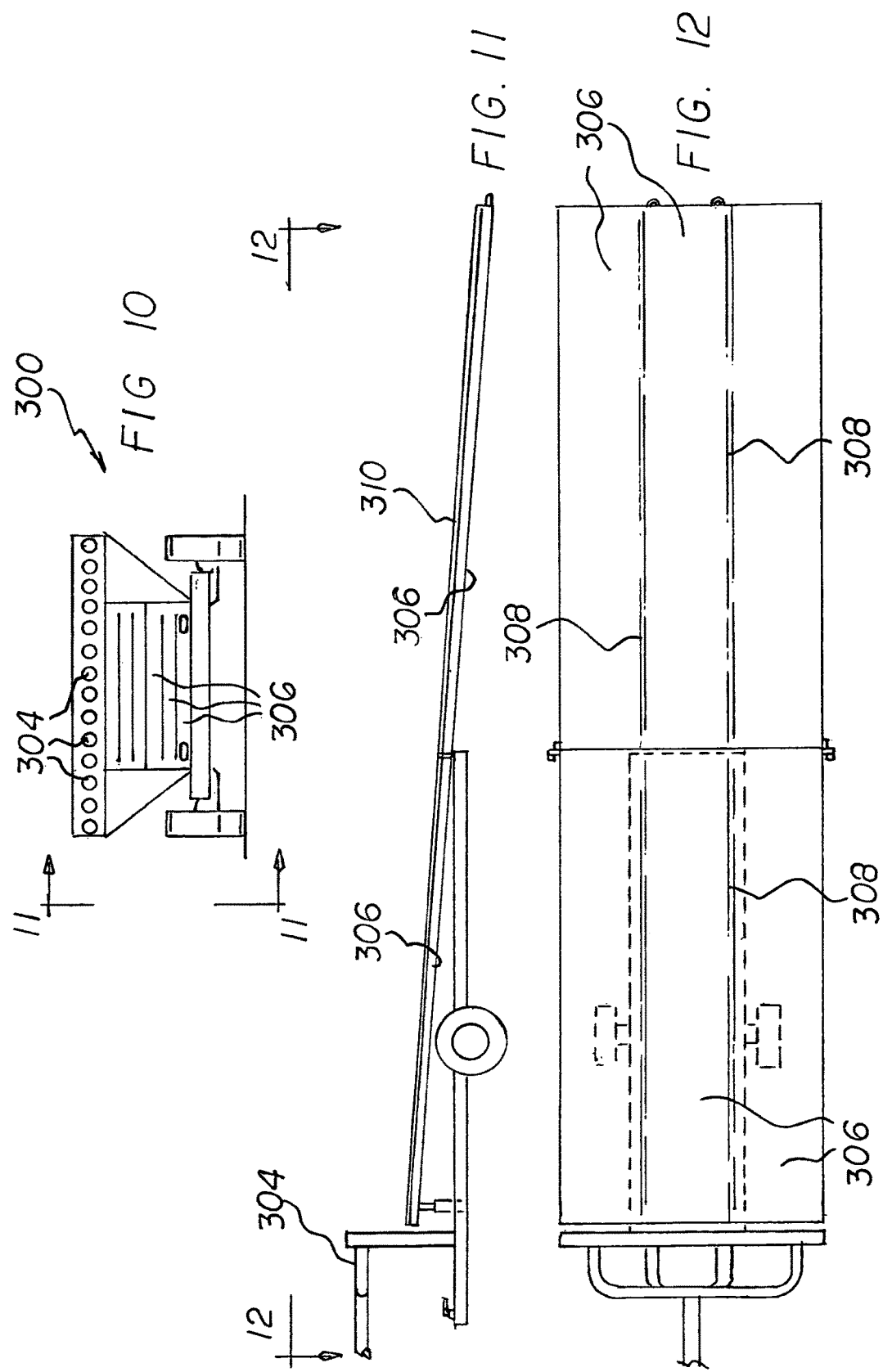

WATER TREATMENT SYSTEM

RELATED APPLICATION

This application is based upon Provisional Application Ser. No. 61/628,495 filed Nov. 1, 2011, the subject matter of which is incorporated herein by reference.

BACKGROUND OF THE INVENTION

Field of the Invention

The present invention relates to a water treatment system and more particularly pertains to cleaning a continuous stream of turbid or contaminated water in an uninterrupted manner, the cleaning being done in a safe, convenient, ecological and economical manner.

SUMMARY OF THE INVENTION

In view of the foregoing disadvantages inherent in the known types of water systems of known designs and configurations now present in the prior art, the present invention provides an improved water treatment system. As such, the general purpose of the present invention, which will be described subsequently in greater detail, is to provide a new and improved water treatment system and method which has all the advantages of the prior art and none of the disadvantages.

To attain this, the present invention essentially comprises a water treatment system. Reference is now made to FIGS. 1, 2 and 6 through 9. A mixing assembly is provided. A settling assembly is provided. Lines are provided. The lines are provided between the mixing and settling assemblies.

The mixing assembly has an influent orifice. The mixing assembly has an effluent orifice. The mixing assembly has a plurality of polymer containers. The polymer containers are provided in series configuration. Each polymer container has an associated injector pump. A specific polymer is provided. The injector pump is adapted to inject a predetermined flow of the specific polymer into a mixing container for a particular application. The polymer is made up of polysaccarides and shellfish casings, or any biological source of biopolymers, from one or any number as necessary. The polymer to clean turbid or contaminated water 32 is provided. The influent orifice of the mixing assembly is adapted to receive a flow of turbid or contaminated water from a source to be cleaned. Polymer water is provided. The effluent orifice of the mixing assembly is adapted to dispense a flow of polymer water. The mixing assembly is chosen from the class of mixing assemblies. The class of mixing assemblies includes single baffles. Note FIG. 2. The class of mixing assemblies includes plural baffles. Note FIG. 3. The class of mixing assemblies includes flow agitators. Note FIG. 4. The class of mixing assemblies includes auger mixers. Note FIG. 5.

The settling assembly has an influent line. The settling assembly has an effluent line. The influent line of the settling assembly is adapted to receive a flow of polymer water to be settled and cleaned. The effluent line is adapted to dispense a flow of settled clean water. The settling assembly has a rectilinear tank. The tank has a diffusion box. The diffusion box is provided adjacent to the input. A plurality of angled support surfaces is provided. The support surfaces are provided between the diffusion box and the effluent line. Each support surface has an undulating cross sectional configuration. An absorbent/filter product is provided. The absorbent/filter product is provided on the undulating surfaces. In this manner particulate matter settled out from the polymer water is received and retained. The diffusion box has effluent openings. In this manner polymer water is fed to the absorbent/filter products. The diffusion box has clean out openings. The clean out openings are provided adjacent to the influent line and effluent line.

The lines also include an input line. The input line couples the mixing assembly and the source of turbid or contaminated water. The lines also include an output line. The output line is provided at the output of the settling assembly. The lines further include an intermediate line. The intermediate line couples the mixing assembly and the settling assembly.

A pump is provided, preferably a suction pump. The suction pump is located between the mixing assembly and the settling assembly. The suction pump is adapted to move water through the system and complete the final mix of the biopolymers.

Provided last are controls. The controls dispense the desired amount of liquid. The liquid can be adjusted accordingly, dependent upon water variables. The system has an input. The input is adapted to pull contaminated water into first container which mixes with first solution and then travels to the second container and mixes with the second solution. The system is adapted to couple a plurality of mixing containers dependent upon amount of different biopolymers needed to achieve clean water. The controls also include monitoring means. The monitoring means are adapted to monitor the volume of contaminated water and the amount of biopolymers used. The monitoring means are adapted to shut down the system. In this manner proper pump shut off/injection system shut off the system in the event of a failure is assured.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water treatment system which has all of the advantages of the prior art water systems of known designs and configurations and none of the disadvantages.

It is another object of the present invention to provide a new and improved water treatment system which may be easily and efficiently manufactured and marketed.

It is further object of the present invention to provide a new and improved water treatment system which is of durable and reliable constructions.

An even further object of the present invention is to provide a new and improved water treatment system which is susceptible of a low cost of manufacture with regard to both materials and labor, and which accordingly is then susceptible of low prices of sale, thereby making such water treatment system economically available.

Even still another object of the present invention is to provide a water treatment system for cleaning a continuous stream of turbid or contaminated water in an uninterrupted manner, the cleaning being done in a safe, convenient, ecological and economical manner.

Lastly, it is an object of the present invention to provide a new and improved water treatment system. A mixing assembly has a container adapted to receive a continuous flow of turbid or contaminated water. An injector is adapted to inject a quantity of polymer into the container. The container has a vacuum gage and air relief valves for use on the vacuum side of the pump. The container also has air agitation inlets. A settling assembly is adapted to receive a continuous flow of polymer water from the mixing assembly via a pump. A first line couples the mixing assembly with a source of turbid or contaminated water. A second line couples the mixing assembly and the settling assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 10 is an end view of a collapsible chute for a settling tank.

FIGS. 11 and 12 are a side elevational view and a plan view taken along line 11-11 of FIG. 10 and along line 12-12 of FIG. 11.

The same reference numerals refer to the same parts throughout the various Figures.

DESCRIPTION OF THE PREFERRED EMBODIMENT

Figure 1:
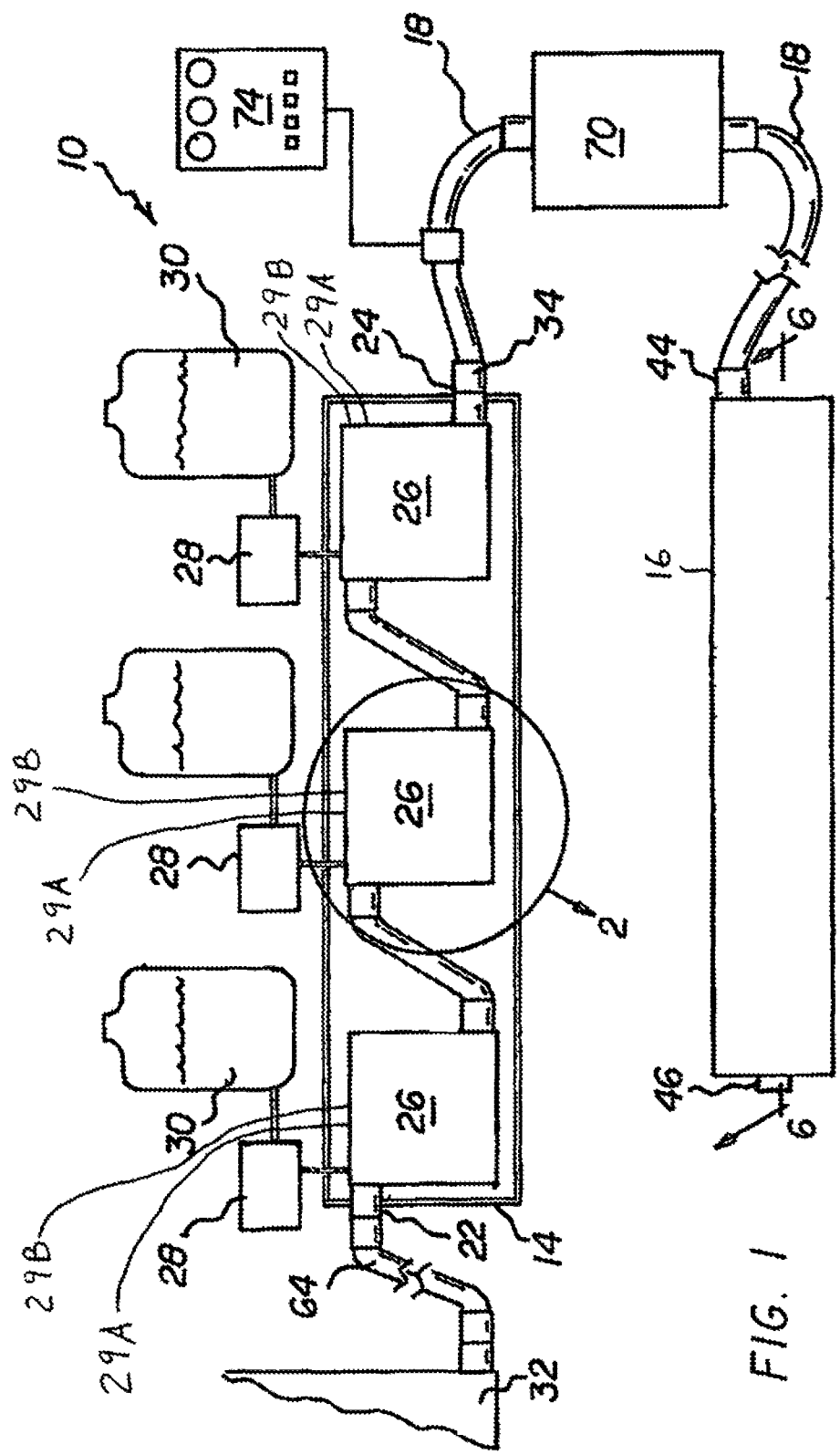
FIG. 1 is side elevational view of a water treatment system constructed in accordance with the principles of the preset invention.

With reference now to the drawings, and in particular to FIG. 1 thereof, the preferred embodiment of the new and improved water treatment system embodying the principles and concepts of the present invention and generally designated by the reference numeral 10 will be described.

The present invention, the water treatment system 10 is comprised of a plurality of components. Such components in their broadest context include a mixing assembly, a settling assembly and a first line. Such components are individually configured and correlated with respect to each other so as to attain the desired objective.

Reference is now made to FIGS. 1, 2 and 6 through 9. A mixing assembly 14 is provided. A settling assembly 16 is provided. Lines 18 are provided. The lines are provided between the mixing and settling assemblies.

Figure 3:
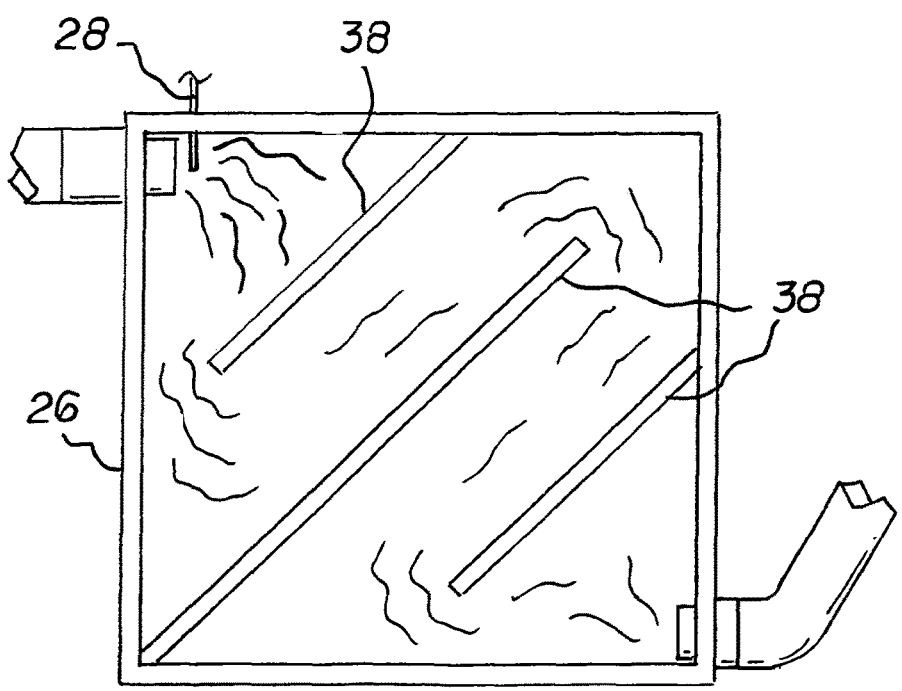
Figure 4:
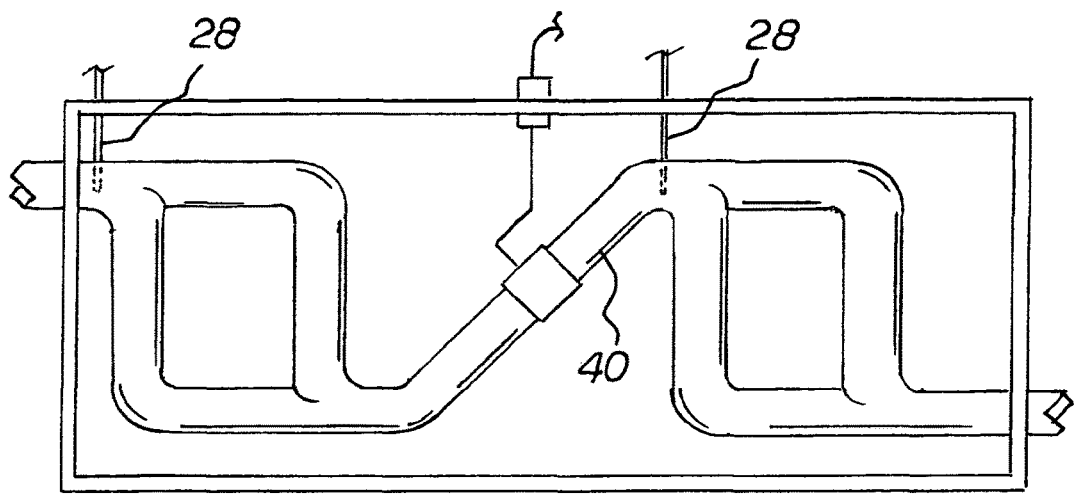
FIG. 4 is an enlarged side elevational view of a flow type mixing container.
Figure 5:
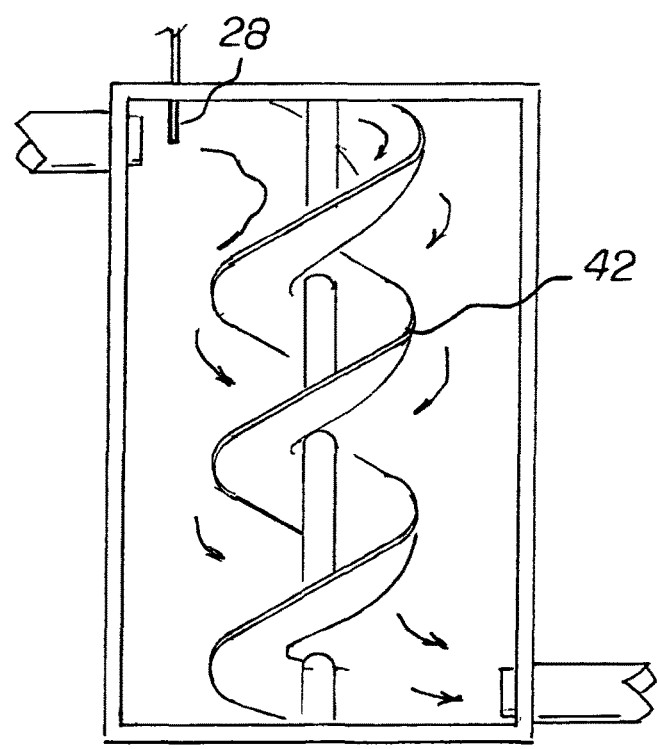
FIG. 5 is an enlarged side elevational view of an auger type mixing container.
Figure 6:
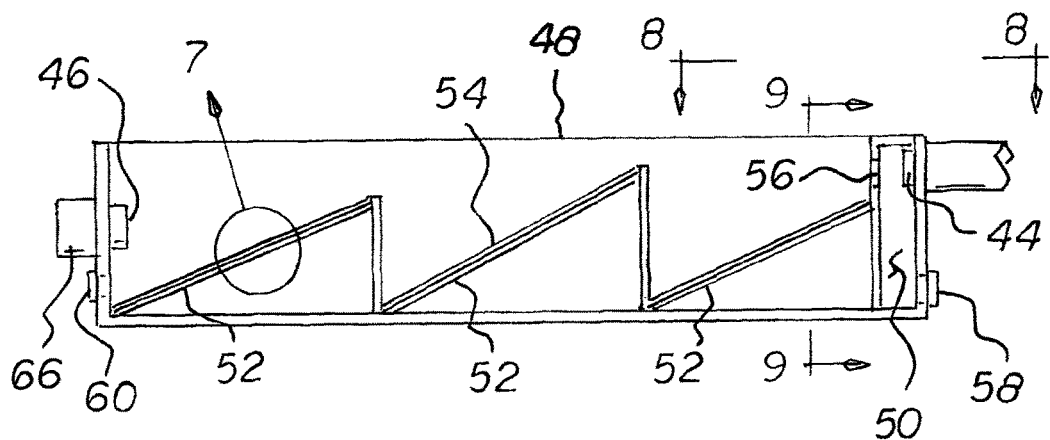
FIG. 6 is a side elevational view of a sediment tank of a settling station.
Figure 7:
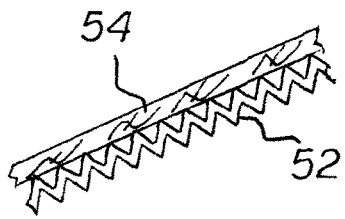
FIG. 7 is an enlarged side elevational view taken at Circle 7 of FIG. 6.
Figure 8:
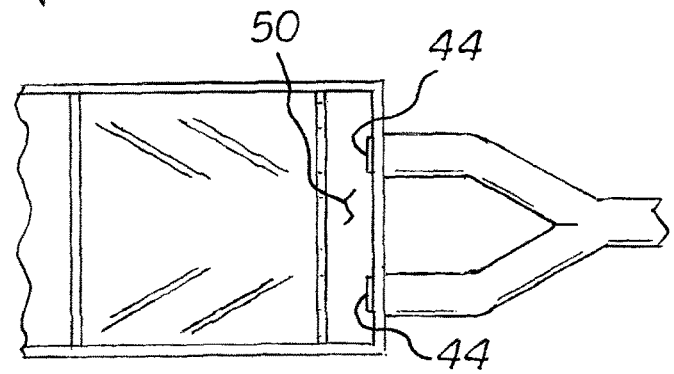
FIG. 8 is a plan view of the input end of the settling tank taken along line 8-8 of FIG. 6.
Figure 9:
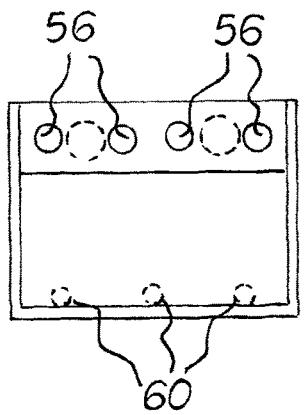
FIG. 9 is a cross sectional view taken along line 9-9 of FIG. 6.

The mixing assembly has an influent orifice 22. The mixing assembly has an effluent orifice 24. The mixing assembly has a plurality of polymer containers 26. The polymer containers are provided in series configuration. Each polymer container has an associated injector pump 28. The container has a vacuum gage 29A and air relief valves 29B for use on the vacuum side of the pump. A specific polymer 30 is provided. The injector pump is adapted to inject a predetermined flow of the specific polymer into a mixing container for a particular application. The polymer is made up of polysaccarides and shellfish casings, or any biological source of biopolymers, from one or any number as necessary. In the preferred embodiment, the polymer is made up of polysaccarides and shellfish casings, 2 to 6 part biopolymers. The polymer cleans contaminated water. Turbid water 32 is provided. The influent orifice of the mixing assembly is adapted to receive a flow of turbid or contaminated water from a source to be cleaned. Polymer water 34 is provided. The effluent orifice of the mixing assembly is adapted to dispense a flow of polymer water. The mixing assembly is chosen from the class of mixing assemblies. The class of mixing assemblies includes single baffles 36. Note FIG. 2. The class of mixing assemblies includes plural baffles 38. Note FIG. 3. The class of mixing assemblies includes flow agitators 40. Note FIG. 4. The class of mixing assemblies includes auger mixers. Note FIG. 5. A pump serves as a final mixing of the polymer water.

The settling assembly has an influent line 44. The settling assembly has an effluent line 46. The influent line of the settling assembly is adapted to receive a flow of polymer water to be settled and cleaned. The effluent line is adapted to dispense a flow of settled clean water. The settling assembly has a rectilinear tank 48. The tank has a diffusion box 50. The diffusion box is provided adjacent to the input. A plurality of angled support surfaces 52 is provided. The support surfaces are provided between the diffusion box and the effluent line. Each support surface has an undulating cross sectional configuration. An absorbent/filter product 54 is provided. The absorbent/filter product is provided on the undulating surfaces. In this manner particulate matter settled out from the polymer water is received and retained. The diffusion box has effluent openings 56. In this manner polymer water is fed to the absorbent/filter products. The diffusion box has clean out openings 58, 60. The clean out openings are provided adjacent to the influent line and effluent line.

The lines also include an input line 64. The input line couples the mixing assembly and the source of turbid or contaminated water. The lines also include an output line 66. The output line is provided at the output of the settling assembly. The lines further include an intermediate line 18. The intermediate line couples the mixing assembly and the settling assembly.

A pump 70 is provided, preferably a suction pump. The pump is located between the mixing assembly and the settling assembly. The pump is adapted to move water through the system.

The container preferably has a vacuum gage and air relief valves for use on the vacuum side of the pump. The container also has air agitation inlets.

Provided last are controls 74. The controls dispense the desired amount of liquid. The liquid can be adjusted accordingly, dependent upon water variables. The system has an input. The input is adapted to pull contaminated water into first container which mixes with first solution and then travels to the second container and mixes with the second solution. The system is adapted to couple a plurality of mixing containers dependent upon amount of different biopolymers needed to achieve clean water. The controls also include monitoring means. The monitoring means are adapted to monitor the volume of contaminated water and the amount of biopolymers used. The monitoring means are adapted to shut down the system. In this manner proper pump shut off/injection system shut off the system in the event of a failure is assured. The system is adapted to be monitored by satellite computer. In addition, the controls also monitor the amount of nephelometric turbidity units, NTU, in the water.

Figure 1A:
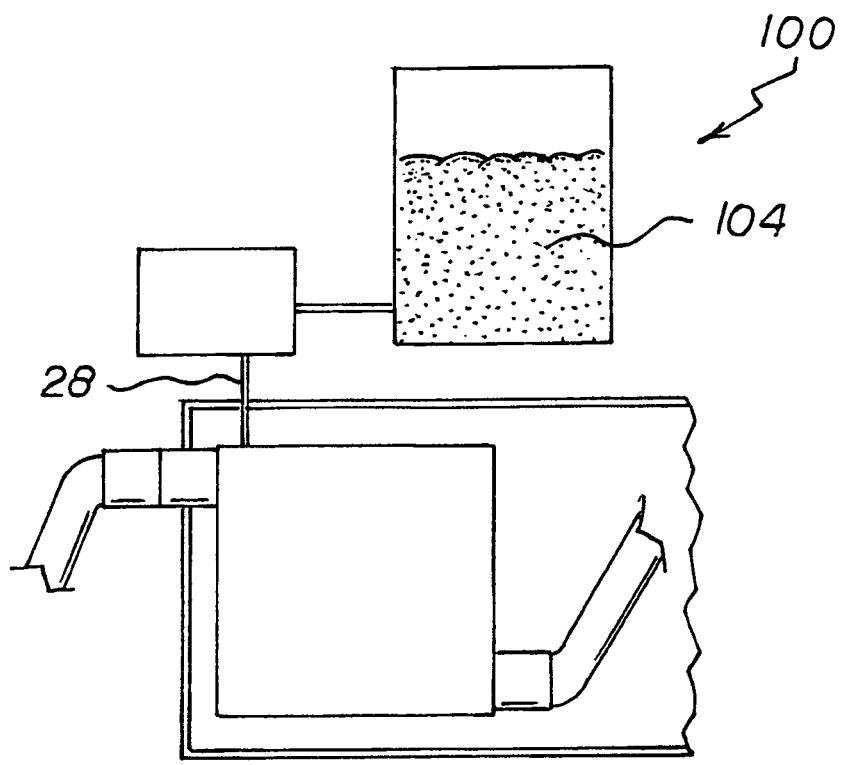
FIG. 1A is a cross sectional view of a mixing container for utilizing dry particulate biopolymers.

An alternate embodiment 100 of the present invention is provided. The biopolymer is in dry particulate form 104. Note FIG. 1A.

The mixing assembly includes a plurality of containers. Each container has a single baffle. Note FIG. 2.

A plurality of containers is provided. Each container has a plurality of baffle. Note FIG. 3.

The mixing assembly includes a plurality of containers. Each container has tubular flow agitators. Note FIG. 4.

The mixing assembly includes a plurality of containers. Each container has an auger mixer. Note FIG. 5.

Note FIGS. 6-9. The settling assembly includes an influent line and an effluent line. The influent line of the settling assembly is adapted to receive a flow of polymer water to be settled and cleaned. The effluent line is adapted to dispense a flow of settled clean water. The settling assembly has a rectilinear tank. The tank has a diffusion box. The diffusion box is adjacent to the input. A plurality of angled support surfaces is provided. The support surfaces are provided between the diffusion box and the effluent line. Each support surface has an undulating cross sectional configuration. An absorbent/filter product is provided. The absorbent/filter product is provided on the undulating surfaces. In this manner particulate matter settled out from the polymer water is received and retained. The diffusion box has effluent openings. In this manner polymer water is fed to the absorbent/filter products. Clean out openings are provided. The clean out openings are provided adjacent to the influent line and effluent line.

It should be understood that additional absorbent/filter products are adapted to be utilized based upon cleanliness of the water on the effluent side of the containers.

Another alternate embodiment 300 of the present invention is provided. Note FIGS. 10-12. The settling assembly includes an influent line 304. The settling assembly includes an effluent line 306. The influent line of the settling assembly is adapted to receive a flow of polymer water to be settled and cleaned. The effluent line is adapted to dispense a flow of settled clean water. The settling assembly has a plurality of support surfaces 306. The support surfaces are provided between the diffusion box and the effluent line. Each support surface has hinges 308. The hinges are adapted for contracting the support surfaces when in an overlapping stored orientation for storage and transportation. Note FIG. 10. The hinges are adapted for extending the support surfaces when in a generally planar extended configuration for operation and use. Note FIGS. 11 and 12. An absorbent/filter product 310 is provided. The absorbent/filter product is provided on the support surface when in the extended configuration. In this manner particulate matter settled out from the polymer water is received and retained.

Figure 2A:
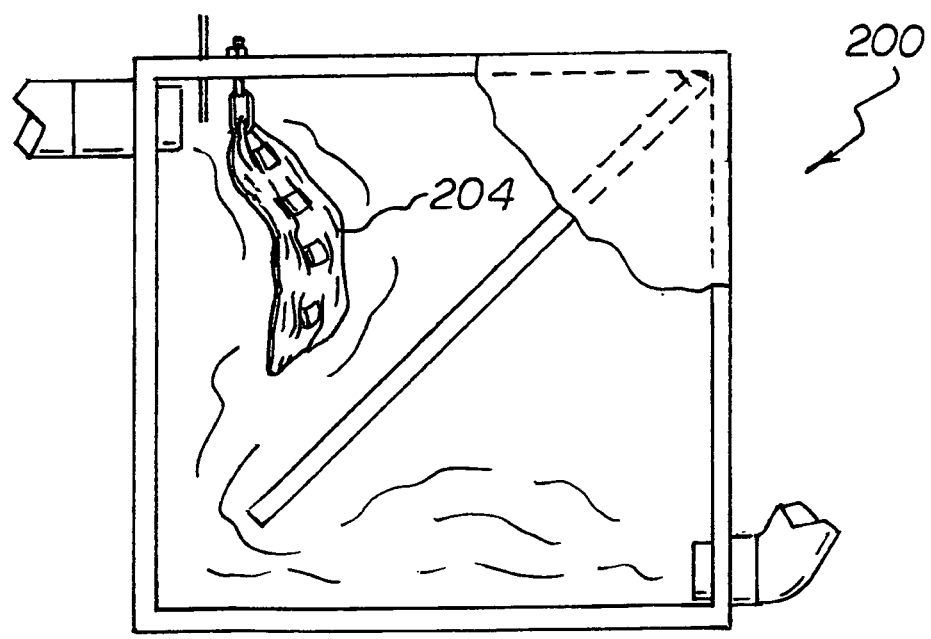
FIG. 2A is a sectional view of a mixing container for utilizing biopolymers saturating a sock.
Figure 2:
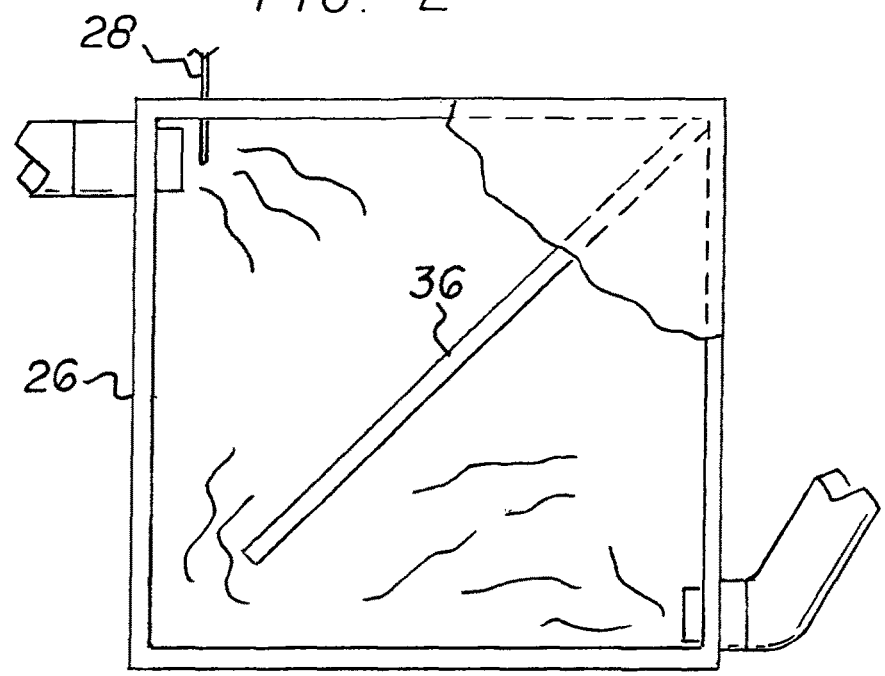
FIGS. 2 and 3 are enlarged side elevational views taken at Circle 2 of FIG. 1 but with a cover removed to show internal constructions of single and multiple baffle type mixing containers.

Another alternate embodiment 200 of the present invention is provided. The biopolymer is in a saturated sock 204. Note FIG. 2A.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water treatment system comprising:
   a mixing assembly having a container adapted to receive a continuous flow of turbid water, an injector adapted to inject a quantity of polymer into the container;
   a settling assembly adapted to receive a continuous flow of polymer water from the mixing assembly;
   a first line coupling the mixing assembly with a source of turbid water, a second line coupling the mixing assembly and the settling assembly;
   a suction pump located between the mixing assembly and the settling assembly, the suction pump adapted to move water through the system; and
   the settling assembly includes an influent line and an effluent line, the influent line of the settling assembly being adapted to receive a flow of polymer water to be settled and cleaned, the effluent adapted to dispense a flow of settled clean water, the settling assembly formed of a rectilinear tank with a diffusion box adjacent to the input, a plurality of angled support surfaces between the diffusion box and the effluent line, each support surface having an undulating cross sectional configuration, an absorbent/filter product on the undulating surfaces to receive and retain particulate matter settled out from the polymer water, effluent openings in the diffusion box for feeding polymer water to the absorbent/filter products, clean out openings adjacent to the influent line and effluent line, additional absorbent/filter products adapted to be utilized based upon cleanliness of the water on the effluent side of the containers.

2. A water treatment system comprising:
a mixing assembly having a container adapted to receive a continuous flow of turbid water, an injector adapted to inject a quantity of polymer into the container;
a settling assembly adapted to receive a continuous flow of polymer water from the mixing assembly;
a first line coupling the mixing assembly with a source of turbid water, a second line coupling the mixing assembly and the settling assembly;
a suction pump located between the mixing assembly and the settling assembly, the suction pump adapted to move water through the system;
the settling assembly includes an influent line and an effluent, the influent line of the settling assembly being adapted to receive a flow of polymer water to be settled and cleaned, the effluent adapted to dispense a flow of settled clean water, the settling assembly formed of a plurality of support surfaces between the diffusion box and the effluent line, each support surface having hinges adapted for contracting the support surfaces when in an overlapping stored orientation for storage and transportation; and
the hinges adapted for extending the support surfaces when in a generally planar extended configuration for operation and use, an absorbent/filter product on the support surface when in the extended configuration to receive and retain particulate matter settled out from the polymer water.

3. A water treatment system (10) for cleaning a continuous stream of turbid water in an uninterrupted manner, the system being comprised of a plurality of components, the components including a mixing assembly (14), a settling assembly (16) and lines (18) there between, the system comprising, in combination:
the mixing assembly (14) having an influent orifice (22) and an effluent orifice (24), the mixing assembly being formed of a plurality of polymer containers (26) in series configuration, each polymer container having an associated injector pump (28) adapted to inject a pre-determined flow of a polymer (30) into a mixing container for a particular application, that cleans contaminated water, the influent orifice of the mixing assembly adapted to receive a flow of turbid water (32) from a source to be cleaned, the effluent orifice of the mixing assembly adapted to dispense a flow of polymer water (34), the mixing assembly is chosen from the class of mixing assemblies including single baffles (36), plural baffles (38), flow agitators (40) and auger mixers;
the settling assembly (16) having an influent line (44) and an effluent line (46), the influent line of the settling assembly being adapted to receive a flow of polymer water to be settled and cleaned, the effluent adapted to dispense a flow of settled clean water, the settling assembly formed of a rectilinear tank (48) with a diffusion box (50) adjacent to the input, a plurality of angled support surfaces (52) between the diffusion box and the effluent line, each support surface having an undulating cross sectional configuration, an absorbent/filter product (54) on the undulating surfaces to receive and retain particulate matter settled out from the polymer water, effluent openings (56) in the diffusion box for feeding polymer water to the absorbent/filter products, clean out openings (58), (60) adjacent to the influent line and effluent line;
the lines (18) further including an input line (64) coupling the mixing assembly and the source of turbid water, an output line (66) at the output of the settling assembly, an intermediate line (18) coupling the mixing assembly and the settling assembly; a suction pump (70) located between the mixing assembly and the settling assembly, the suction pump adapted to move water through the system; and
controls (77) to dispense the desired amount of polymer which can be adjusted accordingly, dependent upon water variables, the system has an input adapted to pull contaminated water into a first container which mixes with a first solution and then travels to a second container and mixes with a second solution, the system is adapted to couple a plurality of mixing containers dependent upon amount an amount of different biopolymers needed to achieve clean water.

4. A water treatment system for treating a contaminated water, comprising:
a container having a mixing assembly adapted to receive the contaminated water;
an injector coupled to a source of polymer and to said container for injecting a quantity of polymer into said container and defining a polymer water;
a settling assembly adapted to receive said polymer water from said container for retaining a particulate matter from said polymer water;
a first line coupling said container with the contaminated water and a second line coupling said container with said settling assembly;
a suction pump in said second line for displacing said polymer water from said container to said settling assembly;
an air relief valve and an air agitation inlet coupled to said container for allowing a quantity of air through said air relief valve and into said container; and
said mixing assembly of said container and said quantity of air in said container agitating the contaminated water and said quantity of polymer for facilitating the mixing of said quantity of polymer with the contaminated water within said container.

5. The water treatment system as set forth in claim 4, wherein said mixing assembly includes a static baffle for facilitating the mixing of said quantity of polymer with the contaminated water within said container.

6. The water treatment system as set forth in claim 4, wherein said mixing assembly includes a plurality of static baffles for facilitating the mixing of said quantity of polymer with the contaminated water within said container.

7. The water treatment system as set forth in claim 4, wherein said mixing assembly includes a plurality of static flow agitators for facilitating the mixing of said quantity of polymer with the contaminated water within said container.

8. The water treatment system as set forth in claim 4, wherein said mixing assembly includes a static auger mixer for facilitating the mixing of said quantity of polymer with the contaminated water within said container.

9. The water treatment system as set forth in claim 4, further including a plurality of containers each having a mixing assembly to receive the contaminated water; and
said plurality of containers defining a series configuration.

10. The water treatment system as set forth in claim 4, further including controls to dispense the desired amount of polymer into said container.

11. The water treatment system as set forth in claim 4, further including controls to shut down said suction pump.

12. The water treatment system as set forth in claim 4, wherein said quantity of polymer includes a liquid polymer.

13. The water treatment system as set forth in claim 4, wherein said quantity of polymer includes a dry particulate polymer.

14. The water treatment system as set forth in claim 4, wherein said quantity of polymer includes a biopolymer.

15. The water treatment system as set forth in claim 4, further including a biopolymer saturated sock positioned within the container for further defining a polymer water.

16. The water treatment system as set forth in claim 4, wherein said settling assembly includes an influent line and an effluent line;
    said influent line of said settling assembly being adapted to receive said polymer water to be settled and cleaned;
    said effluent line adapted to dispense a flow of settled clean water;
    a plurality of angled support surfaces between said influent line and said effluent line;
    said angled support surfaces having an undulating cross sectional configuration; and
    an absorbent/filter product on said undulating surfaces to receive and retain particulate matter settled out from said polymer water.

17. The water treatment system as set forth in claim 16, further including a diffusion box within said settling assembly and adjacent to said influent line; and
    an effluent opening in the diffusion box for feeding said polymer water to said absorbent/filter products.

18. The water treatment system as set forth in claim 4, wherein said settling assembly includes an influent line, an effluent line and a support surface therebetween;
    said influent line of the settling assembly being adapted to receive said polymer water to be settled and cleaned;
    said effluent line adapted to dispense a flow of settled clean water;
    a diffusion box coupled to said influent line; and
    an absorbent/filter product on said support surface.

19. The water treatment system as set forth in claim 18, wherein said support surface includes a plurality of support surfaces between said diffusion box and said effluent line;
    a plurality of hinges adapted for contracting said support services within an overlapping stored orientation for storage and transportation;
    said plurality of hinges adapted for extending said support surfaces when in a generally planar extended configuration for operation and use; and
    said absorbent/filter product on said plurality of support surfaces when in the extended configuration to receive and retain particulate matter settled out from said polymer water.

* * * * *